UNITED STATES PATENT OFFICE.

KARL THUN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ANTHRACENE DERIVATIVE.

No. 844,855.   Specification of Letters Patent.   Patented Feb. 19, 1907.

Application filed November 28, 1906. Serial No. 345,519.

*To all whom it may concern:*

Be it known that I, KARL THUN, a citizen of the German Empire, residing at Elberfeld, Kingdom of Prussia, Germany, have invented new and useful Improvements in Anthracene Derivatives, of which the following is a specification.

I have found that amino-aryl-amino-anthra-quinons containing the amino group in ortho position with regard to the aryl-amino group are converted into new compounds by treatment with aldehydes. The anthraquinon derivatives produced in this way, which are most probably azins, are crystalline and practically insoluble in water. They can be converted by the action of sulfonating agents—for instance, by means of fuming sulfuric acid—into sulfonic acids, the salts of which are soluble in water and which dye wool from acid-baths from blue to green shades of excellent fastness. The reaction takes place most probably, *e. g.*, in accordance with the following equation:

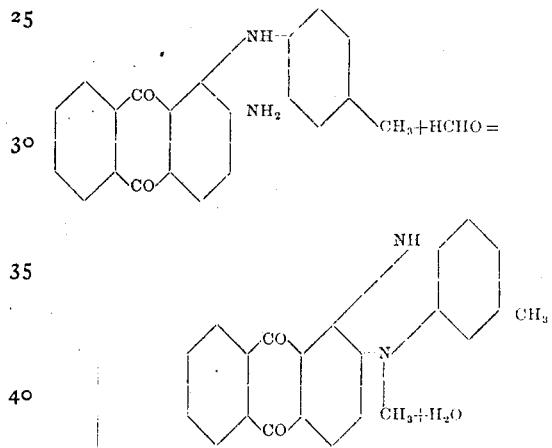

The invention is illustrated by the following examples, the parts being by weight:

Example I. Ten parts of formaldehyde (an aqueous solution of forty per cent.) are introduced into a mixture of ten parts of 1-para-tolyl-amino-2-amino-anthraquinon (obtainable from 1-nitro-2-amino-anthraquinon and para-toluidin) and one hundred parts of glacial acetic acid, which mixture is heated to 100° centigrade. The color of the reaction immediately turns from violet-red to deep blue. The dyestuff deposits, while cooling, in the shape of a crystalline precipitate, which can be purified by a crystallization from glacial acetic acid, pyridin, &c. It forms dark crystals practically insoluble in water. To transform this condensation product into the new dyestuff sulfonic acid ten parts of the finely-pulverized compound are dissolved in one hundred parts of fuming sulfuric acid (three per cent of $SO_3$.) The resulting mixture is then heated to from about 50° centigrade until a test portion is clearly dissolved in hot water. After cooling, the mixture is stirred into water and the sulfonic acid is separated by the addition of common salt filtered off and dried. It is after being dried and pulverized a dark powder soluble in water with a blue color. It dyes wool fast blue shades.

Example II. A mixture of ten parts of 1-para-tolyl-amino-2-amino-3-bromo-anthraquinon (obtainable from para-toluidin and 1.3-dibromo-2-amino-anthraquinon) and one hundred parts of glacial acetic acid is heated on the water-bath and ten parts of benzaldehyde are added to the mixture. The reddish-violet solution turns blue. The reaction is completed after from four to six hours' heating. The new condensation product deposits while cooling in the shape of blue crystals practically insoluble in water. Its sulfonic acid dyes wool blue.

The process is carried out in an analogous manner when starting from other ortho-amino-aryl-amino-anthraquinons or from other aldehydes.

Having now described my invention and in what manner the same is to be performed, what I claim as new, and desire to secure by Letters Patent, is—

1. The herein-described new anthracene derivatives which can be obtained by treating amino-aryl-amino-anthraquinons containing the amino group in ortho position with regard to the aryl-amino group, with aldehydes, which new derivatives are crystalline and when unsulfonated are practically insoluble in water, and which in the shape of their sulfonic acids dye wool from blue to green shades, substantially as hereinbefore described.

2. The herein-described new anthracene derivative which can be obtained by treating 1-para-tolyl-amino-2-amino-anthraquinon with formaldehyde, which new derivative is a dark crystalline powder which when unsulfonated is practically insoluble in water, and which in the shape of its sulfonic acid dyes wool blue shades, substantially as hereinbefore described.

In testimony whereof I have hereunto set my hand in the presence of two subscribing witnesses.

KARL THUN.

Witnesses:
  OTTO KÖNIG,
  T. A. RITTERHAUS.